(12) United States Patent
Cheung et al.

(10) Patent No.: US 7,733,913 B1
(45) Date of Patent: Jun. 8, 2010

(54) STRIPING DATA OVER TRANSMISSION CHANNELS

(75) Inventors: Gene Cheung, Tokyo (JP); Puneet Sharma, Palo Alto, CA (US); Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 982 days.

(21) Appl. No.: 11/496,321

(22) Filed: Jul. 31, 2006

(51) Int. Cl.
*H04J 3/24* (2006.01)
(52) U.S. Cl. ..................................... 370/474
(58) Field of Classification Search .............. 370/351, 370/428, 429, 464, 498, 537, 437, 540, 542, 370/544, 241, 252, 474, 535
See application file for complete search history.

(56) References Cited

U.S. PATENT DOCUMENTS

| | | | |
|---|---|---|---|
| 6,934,249 B1* | 8/2005 | Bertin et al. | 370/218 |
| 2003/0036400 A1* | 2/2003 | Casaccia | 455/515 |
| 2003/0210663 A1* | 11/2003 | Everson et al. | 370/329 |
| 2005/0053170 A1* | 3/2005 | Catreux et al. | 375/267 |
| 2006/0153091 A1* | 7/2006 | Lin et al. | 370/252 |
| 2007/0165524 A1* | 7/2007 | Mascolo | 370/230 |
| 2007/0211635 A1* | 9/2007 | Hao et al. | 370/235 |
| 2008/0171554 A1* | 7/2008 | Chao et al. | 455/455 |

OTHER PUBLICATIONS

Snoeren_Adaptive Inverse Multiplexing for Wide-Area Wireless Networks_1999_IEEE Globecom'99_PP1665-1672.*

Adiseshu, H. et al., "A Reliable and Scalable Striping Protocal", downloaded Jul. 31, 2006.
Carter, C. et al., "User Devices Cooperating to Support Resource Aggregation", downloaded Jul. 31, 2006.
Cetinkaya, C. et al., Opportunistic Traffic Scheduling Over Multiple Network Paths, IEEE INFOCOM 2004.
Cheung, G. et al., "Striping Delay-Sensitive Packets Over Multiple Burst-Loss Channels with Random Delays", downloaded Jul. 31, 2006.
Cheung, G. et al., "Striping Delay-Sensitive Packets Over Multiple Bursty Wireless Channels", downloaded Jul. 31, 2006.
Chou, P. A. et al., "Multiple Description Decoding of Overcomplete Expansions Using Projections onto Convex Sets", downloaded Jul. 31, 2006.
Chou, P. A. et al., "Rate-Distortion Optimized Streaming of Packetized Media", Technical Report MSR-TR-2001-35, Feb. 2001.

(Continued)

*Primary Examiner*—Kwang B Yao
*Assistant Examiner*—Obaidul Huq

(57) ABSTRACT

Data is striped over transmission channels having limited bandwidths and variable delays. Data to be striped over the channels is accessed. An expiration time of at least one packet of the data to be striped is determined. Probabilities of timely receiving the at least one packet are determined using a recursive function and the expiration time and a length of queue storing the at least one packet waiting to be striped. The computed probabilities are stored in a table, and the computed probabilities are retrieved from the table for at least one other packet having the same expiration time and the same queue length. The probabilities are used to map the at least one other packet to at least one of the channels.

20 Claims, 4 Drawing Sheets

OTHER PUBLICATIONS

Duncanson, J., "Inverse Multiplexing", IEEE Communications Magazine, vol. 32, Issue 4, Apr. 1994, Abstract.

Frossard, P., "Joint Source/FEC Rate Selection for Quality-Optimal MPEG-2 Video Deliver", IEEE Transactions on Image Processing, vol. 10, No. 12, Dec. 2001.

Hsieh, H. et al., "A Receiver-Centric Transport Protocal for Mobile Hosts with Heterogeneous Wireless Interfaces", MobiCom 03, ACM 2003.

Hsieh, H. et al., "A Transport Layer Approach for Achieving Aggregate Bandwidths on Multi-Homed Mobile Hosts", MOBICOM'02, ACM Sep. 2002.

Liu, P. et al., "Delay-Sensitive Packet Scheduling in Wireless Networks", downnloaded Jul. 31, 2006.

Miao, Z. et al., "Optimal Scheduling for Streaming of Scalable Media", downloaded Jul. 31, 2006.

Mukherjee, A., "On the Dynamics and Significance of Low Frequency Components of Internet Load", Technical Report: MS-CIS-92-83/DSL-12, Dec. 1992.

Nguyen, G. et al., "A Trace-Based Approach for Modeling Wireless Channel Behavior", Proc. of the 1996 Winter Simulation Conference.

Nguyen, T. et al., "Path Diversity with Forward Error Correction (PDF) System for Packet Switched Networks", IEEE INFOCOM 2003.

Papadopouli, M. et al., "Connection Sharing in an Ad Hoc Wireless Network Among Collaborating Hosts", downloaded Jul. 31, 2006.

Phatak, D. et al., A Novel Mechanism for Data Streaming Across Multiple IP Links for Improving Throughput and Reliability in Mobile Environments, IEEE 2002.

Shakkottai, S. et al., "Scheduling Real-Time Traffice Deadlines Over a Wireless Channel", downloaded Jul. 31, 2006.

Sharma, P. et al., "Distributed Communication Paradigm for Wireless Community Networks", downloaded Jul. 31, 2006.

Snoeren, A., "Adaptive Inverse Multiplexing for Wide-Area Wireless Networks", Proc. of IEEE GlobeCom., Dec. 1999.

Traw, C.B.S. et al., "Striping Within the Network Subsystem", IEEE Network, vol. 9, Issue 4, Jul./Aug. 1995.

Zhai, F. et al., "Rate-Distortion Optimized Product Code Forward Error Correction for Video Transmission Over IP-Based Wireless Networks", downloaded Jul. 31, 2006.

Zorzi, M., "Performance of FEC and ARQ Error Control in Bursty Channels Under Delay Constraints", VTC'98 Ottawa, Canada, May 1998.

Leon-Garcia, A., "Probability and Random Processes for Electrical Engineering", Addison Wesley, 1994, p. 148.

Mao, S. et al., "Multipath Routing for Multiple Description Video in Wireless Ad Hoc Networks", IEEE, 2005.

Mao, S. et al., "On Optimal Partitioning of Realtime Traffice Over Multiple Paths", IEEE, 2005.

* cited by examiner

STRIPING DATA OVER TRANSMISSION CHANNELS

BACKGROUND

The Internet, as it has grown considerably in size and popularity, supports a significant number and types of applications. Diverse applications, such as streaming a video, downloading music, voice-over-IP, and web-based multi-user computer games or conferences are all available to users via the Internet.

As applications become more complex and demanding, it has become a challenge to effectively deliver the applications to users while maintaining quality of service. One of the key obstacles is the limited amount of bandwidth available. Applications, such as multimedia applications and real-time voice and video applications, are highly sensitive to transmission delays. Traditional unicast delivery techniques may not be able to meet the transmission demands of these types of applications and are not scalable to efficiently meet the demands of a large number of service providers and users.

The challenge of effectively delivering applications to users is further exasperated with respect wireless computing devices. Mobile devices may have a communication interface connecting to the Internet via a long range but low speed and bursty wide area network (WAN) link, such as a cellular link. Recently, there has been a lot of interest in delivering services to mobile devices, such as streaming video and other real-time applications, over cellular links. However, the cellular links have bursty packet losses and limited bandwidth that make it difficult to provide these services to the mobile devices without incurring degradation in quality. Furthermore, the user may incur heavy costs when using a cellular link for an extended period of time.

BRIEF DESCRIPTION OF THE DRAWINGS

Various features of the embodiments can be better appreciated, at the same time become better understood with reference to the following detailed description when considered in connection with the accompanying figures, in which.

DETAILED DESCRIPTION OF THE EMBODIMENTS

In the following detailed description, references are made to the accompanying figures, which illustrate specific embodiments. Electrical, mechanical, logical and structural changes may be made to the embodiments without departing from the spirit and scope of the embodiments.

Many wireless devices, such as laptops, personal digital assistants (PDA)s, and cellular phones are multi-homed. In other words, these devices have multiple communication interfaces. For example, a wireless device connects to the Internet using a wireless WAN interface, such as a cellular interface, and may also connect to a local area network (LAN) via another communication interface, such as a Bluetooth interface.

WAN links used by wireless devices or other types of devices provide long range service, but the bandwidth is limited and packet losses are frequent and bursty. According to an embodiment, low speed WAN links are aggregated to form a high-speed logical WAN link. The aggregation is achieved by striping data, also referred to as inverse multiplexing, over the WAN links. Such channel aggregation can enable delay sensitive services, such as rich-media streaming, which would be difficult on a single WAN channel.

A striping engine assigns an incoming flow of packets to multiple channels based on application requirements and channels conditions. The striping engine is operable to stripe packets over multiple, bursty, channels having random delays. Each channel is modeled. For example a two-state Markov chain, which is a Gilbert model, may be used to model a WAN link. Instead of modeling the transmission delay of a WAN link as a constant, the transmission delay may be modeled using variables. For example, a shifted Gamma distributed random variable may be used to model delay, which was found to be accurate for a common network load. In addition to delay, other link characteristics, such as loss rate and bandwidth, may be used to model the WAN links. Striping may then be performed using the modeled WAN links.

According to an embodiment, striping is optimized by determining probabilities of timely and correctly delivering data to be striped using different transmission techniques that may include error detection and/or correction. It may be computationally intensive to compute these probabilities repeatedly. Accordingly, a table is used to store the probabilities and table lookups may be performed to stripe future data. Also, according to an embodiment, weighting functions are introduced to drive the long-term striping system evolution away from pathological local minima that are far from the global optimum.

Figure 1:
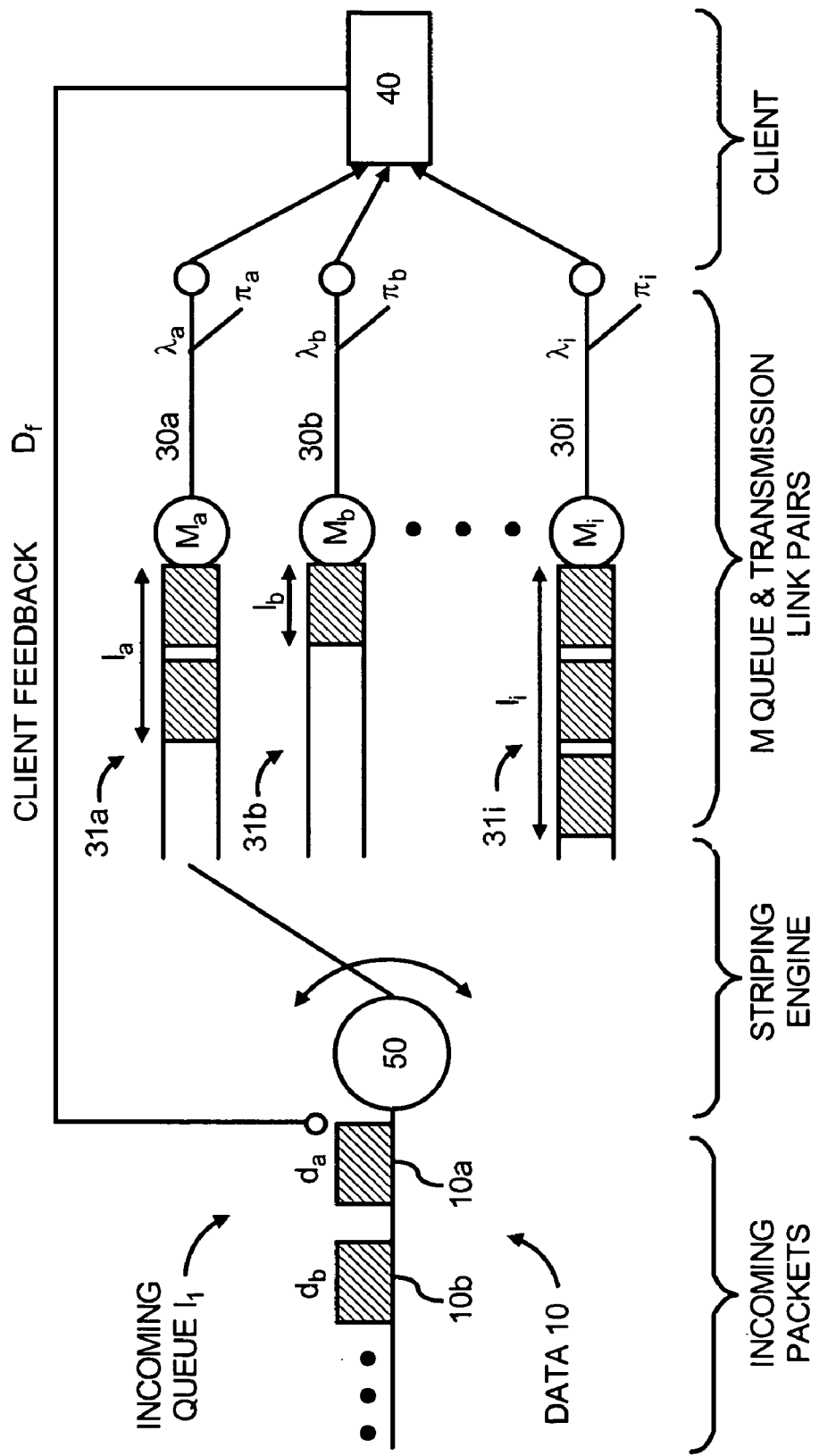
FIG. 1 illustrates a system, according to an embodiment.

FIG. 1 illustrates a logical block diagram of a system 100 for striping time sensitive data, according to an embodiment. The system 100 includes a flow of time sensitive data 10 to be striped by the striping engine 50. The data 10, for example, includes packets, such as the packets 10a-b. The data 10 may include an expiration time. FIG. 1 shows an expiration time, d, for the data 10, such as $d_a$ and $d_b$ for the packets 10a and 10b, respectively. If the data is received after the expiration time, the data is useless. For example, the data 10 may include streaming video. If a frame of the streaming video is received after the expiration time for the frame, the frame and its dependent frames, such as I or P frames for MPEG frames, may be corrupted. The data 10 to be striped may include time sensitive dependent data, such as streaming video or streamlining audio, time sensitive independent data, or non-time sensitive data that may not include an expiration time. Examples of the data include bulk data transfers or file transfers, real-time or non-real-time video and/or audio, etc.

A striping engine 50 is operable to stripe the data 10 across a plurality of transmission channels, such as the channels 30a-i. Striping is the mapping of a single data flow to multiple channels. The data 10, for example, is from a single flow, such as a streaming video flow. Error detection/correction data may be striped along with the data 10. Examples of error detection and/or correction data include forward error correction (FEC) data, parity data, and other known types of data used for transmission error detection and/or correction.

As shown in FIG. 1, packets for the data 10 are injected into an incoming queue $I_1$ before the striping engine 50. Each packet may be labeled with an expiration time. The packets may be ordered by expiration time. The striping engine 50 is activated whenever there are packets in the incoming queue $I_1$. The striping engine 50 maps the packets of the data 10 to the channels 30a-i, which includes assigning one or more packets to a particular channel. Striping allows for effective traffic mapping onto the channels for optimized performance, such as high throughput and bounded delay, which may be critical for certain applications, such as streaming video and others, needing the optimized performance.

The channels $30a$-$i$, for example are bandwidth-limited, burst loss channels with random delays, and the striping engine 50 models the channels $30a$-$i$ as such. Each channel, for example, is modeled is a FIFO queue, $31a$-$i$, and a transmission link, $32a$-$i$. Each queue 31 has a constant service rate p and is connected to a transmission link 32 with random delay, A, and loss rate, n. At a given time, the fullness of a queue is l. The time required to transmit a packet through a queue, such as the queue $31a$, is $(l_a+1)/\mu_a+\lambda_a$. A client 40 receives the striped packets and reassembles the packets into the single flow. The client 40 may inform the striping engine 50 of a loss event, such as a lost packet or a packet received after its expiration time, in a constant, lossless time, $D_f$.

Figure 2:
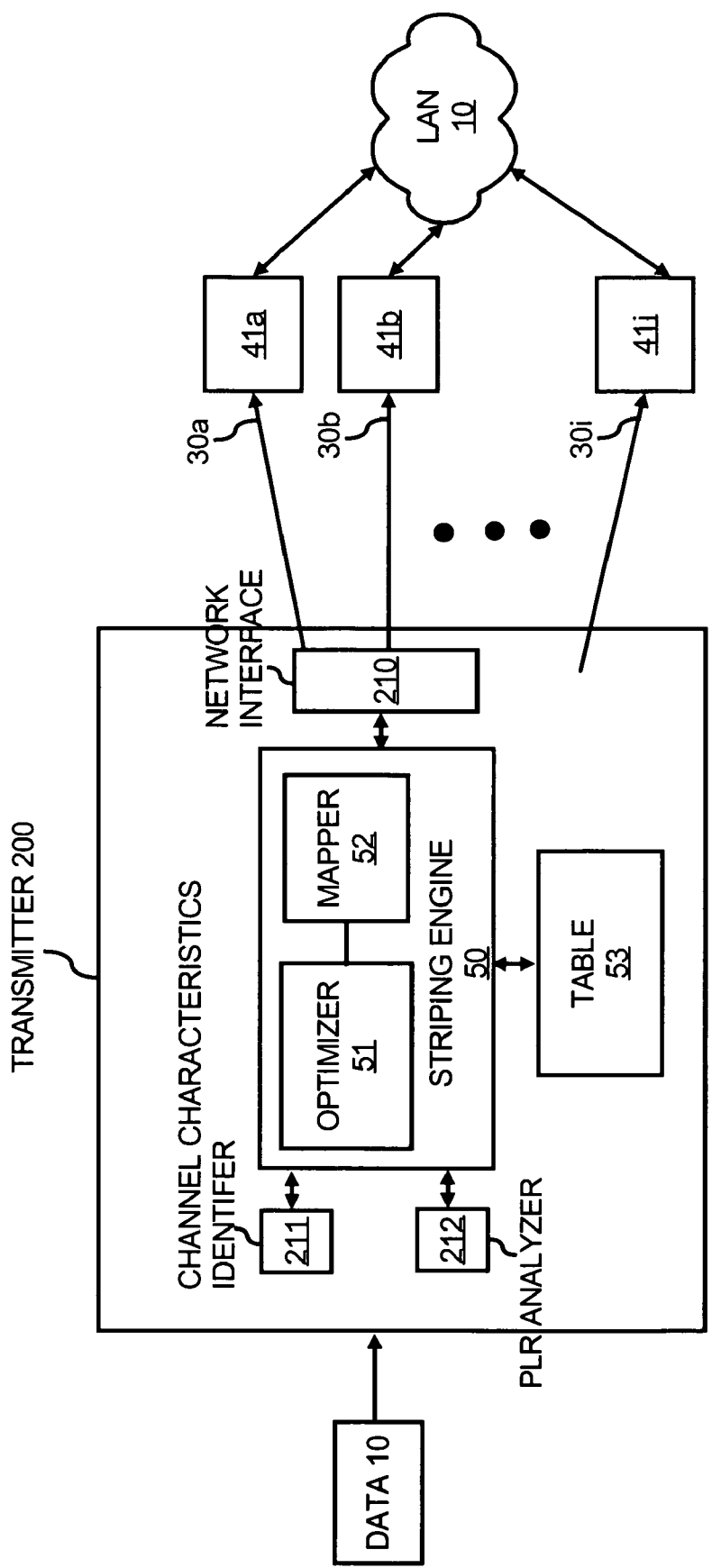
FIG. 2 illustrates an embodiment of the system shown in FIG. 1.

FIG. 2 illustrates an embodiment of the system 100, where the striping engine 50 is operable to stripe an application flow over the channels $30a$-$i$ comprised of a plurality of WAN links, also referred to as WAN links 30. Each WAN link may be a bandwidth-limited, burst loss channel with random delay and an estimated loss rate. In one embodiment, the WAN links 30 are wireless, but the WAN links 30 may also be wired. The client 40 of FIG. 1 may include a plurality of user devices 41, shown as $41a$-$c$ in FIG. 2, connected via a LAN 10.

Each of the user devices 41 conventionally communicates via a WAN link at a data rate equivalent to the data rate of a single one of the WAN links 30. However, according to an embodiment, the striping engine 50 provides a striping service which allows the user devices 41 to share each others WAN links 30 in a coordinated fashion to obtain a single, logical, high-speed WAN link.

Each user device may be connected to a particular WAN link for receiving packets for the striped application flow. The user devices 41 may be connected via LAN 10 for exchanging and reconstructing the received striped data on the WAN links 30. The user devices 41 receiving the striped application flows re-synchronize out-of-order delivery packets to reconstruct the application flows. For example, if the user device $41a$ desires to receive the application flow, the user device $41a$ receives the striped packets for the application flow from the user devices $41b$-$c$ via the LAN 10 and a reassembler 42 reassembles the packets into the application flow. Reassembly software known in the art that is operable to handle the reordering of packets may be used to reconstruct an application flow. Applications, such as media streaming, may use receiver buffers, not shown, for packet reordering at the user devices 41. Although not shown, the other user devices may include reassemblers. The LAN 10 includes links that typically have a greater bandwidth than the WAN links 30.

The WAN links 30 may be provided in the Internet and/or another public or private WAN. The WAN links 30 connecting the user devices 41 to systems, such as web sites or other systems. The WAN links 30 may include cellular telephony connections or Internet access service connections such as provided by an Internet service provider (ISP).

The user devices 41 may include communication interfaces for communicating via the WAN links 30 and the LAN 10. Examples of user devices that may be used for the user devices $41a$-$d$ include but are not limited to laptops, desktops, PDAs, cellular phones, servers, and the like. The user devices 41 may be multi-homed. For example, the user device $41a$ includes a LAN interface 43 and a WAN interface 44. The remaining user devices may also be multi-homed.

The LAN 10 may include a wireless and/or wired LAN. The LAN 10 may include a short-range wireless network that is operable to provide higher transmission rates for transmission between the user devices $41a$-$d$ when compared to transmission rates on the WAN links $30a$-$d$. Wireless protocols that may be used for the LAN 10 may include Bluetooth or 802.11.

A two-sided channel monitor (not shown), such as a monitor at the WAN side and a monitor at the user device side of a WAN link, may be used to sense link characteristics, such as bandwidth, loss rate, latency, security, reliability, cost, etc.

It will be apparent to one of ordinary skill in the art that a single user device or multiple user devices may be used. If a single user device is used, the device may have multiple WAN interfaces. Furthermore, the striping engine 50 may be located in one of several areas. For example, the striping engine 50 may be located at a content provider server, at a service provider, or at a third party location in the WAN. Also, more or fewer than three WAN links may be used.

FIG. 2 also shows a detailed block diagram of the striping engine 50. For example, the striping engine 50 includes an optimizer 51, a mapper 52 and a table 53, according to an embodiment. The optimizer 53 is operable to select a channel and a transmission technique for transmitting striped data to a destination, such as one of the user devices 41. For example, the optimizer 51 is operable to select a transmission technique and a channel that has the highest probability of transmitting a striped packet to its destination prior to its expiration time. The optimizer 51 may determine the expiration time of data to be striped, for example, from packet headers or other sources, such as a content provider providing the packets.

According to an embodiment, the WAN links 30 are modeled based on characteristics, such as delay, loss rate, and bandwidth. A recursive function taking into consideration the WAN link characteristics may be used to determine the probabilities of timely and correctly receiving a packet using a particular transmission technique and using a particular WAN link. The probabilities are used to select a WAN link and a transmission technique. For example, the WAN link and transmission technique combination having the highest probability is selected for transmitting the packet. Examples of transmission techniques include but are not limited to forward error correction (FEC), which uses parity data, automatic repeat-request (ARQ), where the receiver detects transmission errors and sends a message to the transmitter to retransmit the data, and a hybrid FEC/ARQ. These transmission techniques and functions for determining probabilities for timely and correctly striping data using these transmission techniques are described below.

The optimizer 51 is also operable to generate and store entries for the table 53, including the probabilities of timely and correctly receiving striped data for different channels using different transmission techniques. For example, some of the recursive functions for calculating the probabilities may be computationally intensive, especially due to the recursive functional calls that perform repeated computations using the same function. Thus, in order to save time, once the probabilities are calculated, the probabilities are stored in the table 53. Then, when data needs to be striped having the same variables, such as the same expiration time and/or the same queue length, such as the length of the queue $31a$, $31b$ or $31i$ shown in FIG. 1, a table lookup may be performed to retrieve the probabilities instead of re-calculating the probabilities. For example, a recursive function f( ) is used to calculate the probabilities for timely and correctly receiving a striped packet. Recursive calls for f( ) require repeatedly computing f( ) and storing the computation results in the table 53 so future recursive calls for the same argument can be looked up. So, for the argument, a, f(a) may be repeatedly computed and results stored in the table 53.

For example, the data 10 may be an application flow. The application flow is divided into subflows that are to be assigned to the same channel when transmitted. The subflows may be comprised of packets having the same expiration time and queue length. Once probabilities are calculated for one packet in the subflow and stored in the table 53, the optimizer 51 may retrieve the probabilities from the table 53 for other packets in the subflow.

In one embodiment, one or more of the functions for calculating the probabilities are dynamic programming functions, such as greedy algorithms. Then, the table 53 may comprise dynamic programming entries.

In one embodiment, the size of the table 53 is limited to a predetermined number of entries, H, placing an upper bound on the execution time for table lookups. To do so, an index a' for the table 53 is derived by dividing the argument, a, of f(a) by the constant, K, to place or retrieve a value into or from the table 53. The constant, K, may be selected so that all possible arguments, a's, map inside the available space, H, of the table 53 as follows:

$$K = \frac{a_{max}}{H-1} \text{ and}$$

$$a' = \left\lfloor \frac{a}{K} \right\rfloor$$

where $a_{max}$ is the largest possible argument for the recursive function f( ) If f( ) is monotonically non-decreasing by definition, the rounding down operation provides a lower bound when calculating f( ) recursively using the table 53.

When performing a table lookup, probabilities may be retrieved for packets when parameters for the network model are unchanged from packet to packet. For example, f( ) may be computed based on expiration time, d, and sizes of a queue, such as sizes of one of the queues 31*a*-*i*. Each time f(d) is computed using f( ) the solutions are stored in entries [d][I₁] [I₂][I₃] of the table 53. For example, [d][I₁], [d][I₂] and [d][I₃] are three entries for decreasing queue length for the same queue and the same packet.

When a future packet arrives with the same expiration time, d, and observable queue sizes I1, I2 and I3, the striping engine 50 can have the packets probabilities simply looked up in the table 53. Similar dividing and rounding operation by the same constant factor K can be done as well to further reduce complexity at the cost of solution quality.

The striping engine 50 also includes a mapper 51 for assigning a WAN link selected by the optimizer 50 to the data to be striped, such as a packet. The striping engine 50 may be provided in a transmitter 200 operable to transmit striped data to the user devices 41. The striping engine 50 may instruct a network interface 210 to use the assigned WAN links and transmission techniques selected by the striping engine 50 for transmitting striped data to the user devices 40. The network interface 210 may be operable to generate and include parity data for a subflow and transmit the data and parity data for the subflow to the user devices 40. The subflow may include a single packet or multiple packets. The parity data may be used for FEC transmission. The network interface 210 may also be operable to perform ARQ transmission or execute other transmission techniques that may include error correction.

The transmitter 200 may also include a channel characteristics identifier 211 for determining the characteristics of the WAN links 30. For example, the channel characteristics identifier 211 determines packet loss ratio, channel bandwidth, delay and/or any other channel characteristic, using techniques known in the art. Feedback from the destination, such as the user devices 40 may be used to determine the channel characteristics. The striping engine 50 may use the channel characteristics to determine the probabilities of timely and correctly receiving data to be striped.

Figure 3:
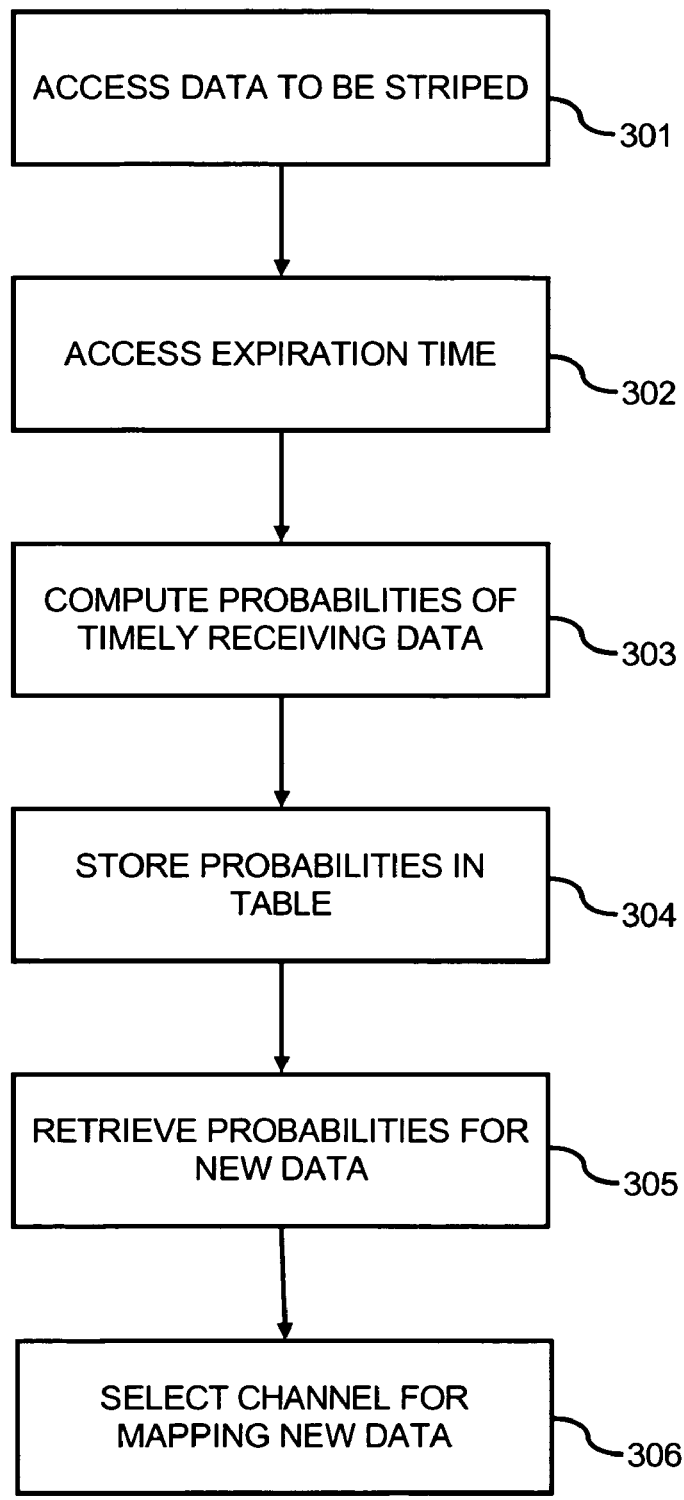
FIG. 3 illustrates a flow chart of a method for striping data over transmission channels, according to an embodiment.

FIG. 3 illustrates a method 300 for striping data over a plurality of transmission channels, according to an embodiment. The method 300 is described with respect to FIGS. 1-2 by way of example and not limitation. The method 300 may be performed in systems other than shown in FIGS. 1-2.

At step 301, data to be striped is accessed. For example, as shown in FIG. 1, the incoming queue I₁ is filled with data to be striped, such as the packets of the data 10 shown in FIG. 1. The striping engine 50 accesses the data in the incoming queue I₁.

At step 302, an expiration time associated with the data to be striped is accessed. For example, packets in the incoming queue I₁ may include an expiration time in each packet header. Expiration times may be provided from other sources.

At step 303, a function, the expiration time, and a queue length are used to compute probabilities of timely receiving data to be striped. For example, the packet 10*a* has an expiration time $d_a$. A recursive function f( ) may be used to calculate probabilities of receiving the packet 10*a* at a destination prior to the completion of the expiration time for each of the channels 30 and for a plurality of transmission techniques, such as FEC, ARQ, and/or hybrid FEC/ARQ.

At step 304, the computed probabilities are stored in a table. For example, the striping engine 50 stores the computed probabilities in the table 53; shown in FIG. 2.

At step 305, probabilities are retrieved from the table for new data to be striped. For example, the packet 10*b* shown in FIG. 1 needs to be striped, and has the same expiration time and queue length for the packet 10*a*. The striping engine 50 retrieves the probabilities, using, for example, the expiration time as an index to search the table 53 for matching entries.

At step 306, the retrieved probabilities are used to select a channel for mapping the new data to be striped.

Forward Error Correction for Bursty Channels

As stated above, in one embodiment, error correction is implemented to reduce the packet loss over a bursty channel. For example, if the total capacity of the aggregated channels is more than the offered load, in one embodiment, the extra channels can also be used for transmitting error correction packets. This embodiment examines how forward error correction (FEC) can be applied to the incoming data packets while striping. In particular, this embodiment concentrates on a particular systematic block code, such as the (n, k) Reed-Solomon code but other types of coding may be used.

Essentially, the striping engine 50 adds n minus k, i.e., (n−k), parity packets to every k data packets so that the reception of any k or more packets in a block of n packets constitutes a full k data packet recovery. Reed-Solomon code is commonly used in practice for FEC error recovery systems with delay constraints. However, it is appreciated that many other forward error correction schemes are well suited to be used in accordance with the embodiments.

This embodiment derives the expected packet loss ratio (PLR) $\alpha_{RS}$ after FEC has been applied to incoming traffic being transferred over a bursty channel. Channel characteristics, including packet loss ratio, may be used to improve on-time delivery of time sensitive data. Condition on the status of the last packet transmitted (loss/success), giving two conditional probabilities, $\alpha_{RS|1}$ and $\alpha_{RS|0}$, respectively. Thus $\alpha_{RS}$ can be expressed in terms of conditional probabilities as (wherein π is the packet loss ratio):

$$\alpha_{RS} = \pi * \alpha_{RS|1} + (1-\pi) * \alpha_{RS|0}$$

To find $\alpha_{RS|1}$, consider the k data packet block and the n−k parity packet block separately. Now condition on the status of the last data packet (k-th data packet); given the k-th data packet is lost or received, embodiments use R(.,.) or S(.,.) for probability calculation of the trailing n−k parity block.

Conditioning on the event when the k-th data packet is lost, consider all cases when any number i of the remaining k−1 data packets are lost. Each case i will have a loss of $$\frac{i+1}{k},$$

assuming there are at least n−k+1 total loss packets including the n−k parity packet block. Similar analysis conditioning on the event when the k-th data packet is successfully received completes the derivation for $\alpha_{RS|1}$ which can be expressed as:

$$\alpha_{RS11} = \sum_{i=0}^{k-1} \left(\frac{i+1}{k}\right) r(i, k-1) \sum_{j=[n-k-i]^+}^{n-k} R(j, n-k) +$$
$$\sum_{i=1}^{k-1} \left(\frac{i}{k}\right) \bar{r}(i, k-1) \sum_{j=[n-k+1-i]^+}^{n-k} S(n-k-j, n-k)$$

where $[x]^+$ is the positive part of x.

Following similar analysis for $\alpha_{RS|0}$:

$$\alpha_{RS10} = \sum_{i=0}^{k-1} \left(\frac{i+1}{k}\right) \bar{s}(k-1-i, k-1) \sum_{j=[n-k-i]}^{n-k} R(j, n-k) +$$
$$\sum_{i=1}^{k-1} \left(\frac{i}{k}\right) s(k-1-i, k-1) \sum_{j=[n-k+1-i]}^{n-k} S(n-k-j, n-k)$$

Using the derivation in the previous section, the effect of loss parameters on the effective PLR when data is sent over a bursty channel is protected using FEC is examined. Embodiments also compare the performance of sending data over a single bursty channel with striping it over a set of multiple channels with the same loss characteristics. One embodiment uses RS (3,2) code for FEC. As expected, irrespective of the burst length, the effective PLR increases as the raw PLR increases. It can be determined that effective PLR is also a function of the burst length. As the burst length increases, the effective PLR also increases.

Embodiments also consider a simple case of striping the RS (3,2) encoded data over three bursty channels, each with the same raw PLR. The three FEC packets (two data packets and one parity packet) are each assigned to separate channels. Since all the FEC packets of each block are assigned to a separate channel, effective PLR for the striped FEC data is independent of the burst length. It is determined that as the raw PLR increases, the performance difference between each of the single channel FEC case and the striping FEC case becomes more pronounced.

In summary, in general, striping packets across channels has similar effect as reducing the burstiness of a single channel, and hence improves the performance of FEC, which is sensitive to burstiness. Given this observation, embodiments analyze in the next section how to analyze the performance of a particular mapping for striping RS (n, k) code to a set of m bursty channels. Doing so will lead towards the goal of finding the optimal mapping for a given RS (n,k) code and a set of m channels.

Stripping Forward Error Correction (FEC) Data

For a given FEC code, the data packets and parity packets can be striped over a set of channels in multiple ways. The mapping of k data packets and n−k parity packets to m bursty channels is called an FEC distribution. Such a mapping can be denoted by $g:(k,n-k) \to (u,v), u,v \in I^m$. It is essentially a mapping of two scalars to two vectors of length m, where $u_i$ ($v_i$) represents the number of data packets (parity packets) assigned to channel i. In this section, the derivation in the previous section is extended and analyzes PLR of a given FEC distribution.

Let random variable X be the number of data packets unrecoverable in k data packets after a mapping g of a RS (n, k) code to m' channels. Let Y and Z be the number of correctly transmitted data and parity packets, respectively. The three random variables are related as follows:

$$X = \begin{cases} k-Y & \text{if } Y+Z \le k-1 \\ 0 & o.w. \end{cases}$$

Further let random variables $Y_i < u_i$ and $Z_i < v_i$ be the number of data packets and parity packets correctly delivered in channel i, where:

$$Y = \sum_{i=1}^{m} Y_i, \, Z = \sum_{i=1}^{m} Z_i$$

The derivation is simplified by analyzing the data and parity parts separately, the probability mass function (pmf) of $Y_i$ can be written as:

$$P(Y_i = j) = \pi_i R(u_i - j, u_i) + (1 - \pi_i) S(j, u_i)$$

where $j=0, \ldots, u_i$. $Z_i$ can be written similarly. Since Y and Z are sums of random variables, the standard technique of using probability-generating function (pgf) can be used:

$$G_Y(\omega) = E[\omega^Y] = \sum_j P(Y=j) \omega^j$$
$$= E[\omega^{Y_1 + \cdots + Y_m}]$$
$$= E[\omega^{Y_i}] \cdots E[\omega^{Y_m}] = G_{Y_1}(\omega) \cdots G_{Y_m}(\omega)$$

Hence pgf $G_Y(w)$ is a product of pgfs $G_{Y_1}(w)$ through $G_{Y_m}(w)$. Then recover the pmf of Y from pgf $G_Y(w)$ using the following formula:

$$P(Y=j) = \frac{1}{j!} \frac{d^j}{d\omega^j} G_Y(\omega)|_{w=0}$$

The pmf of Z can be found similarly. Given pmfs of Y and Z, the pmf and then the expectation of X can be found using:

$$P(X=j) = P(Y-k-j | Z \le j-1)P(Z \le j-1)E[X] = \sum_{j=1}^{k} jP(Y=k-j | Z \le j-1)P(Z \le j-1)$$

Denote $\pi(g)$ as $E[X]/k$—the effective PLR given mapping g for RS (n,k) code.

In one embodiment, a number of mappings of the data to be striped to the plurality of wireless channels is determined. To determine the number of unique mappings g's to m channels given a RS (n,k) code, first consider the number of mappings of k data packets to m channels t(m,k), assuming packets are indistinguishable. Suppose i data packets are assigned to channel 1. Then the number of unique mappings for k-i remaining packets in the remaining m-1 channels is t(m-1, k-i). Letting i range from 0 to k the following recursion is generated:

$$t(m,k) = \sum_{i=0}^{k} = (m-1, k-i)$$

The base cases are as follows:

$$t(m,0) = 1$$
$$t(m,1) = m$$
$$t(1,k) = 1$$

Given the recursive definition, it can be shown by inspection that t(m,k) is equivalent to m+k-1 chooses k.

$$t(m,k) = \binom{m+k-1}{k}$$

Together with the mappings of n-k parity packets to m channels, the total number of mappings is t(m,k)*t(m,n-k), which grows faster than exponential growth rate. For large values of m and k, exhaustively searching through all possible mappings is clearly impractical. In such cases, a greedy algorithm may be used to determine a good FEC distribution.

A greedy algorithm incrementally grows an FEC distribution one packet at a time. The order in which the FEC distribution is grown, such as when to insert a data packet or a parity packet, greatly affects the performance. For a first greedy algorithm, greedy1, one data packet is allocated to the optimum channel, such as a channel in which adding the additional packet will result in the smallest PLR. It then allocates one parity packet to the optimum channel, then the rest of the data packets one at a time to the optimum channel, and then the rest of the parity packets. Greedy2 allocates one data packet to the optimum channel, all the parity packets one at a time to the optimum channel, and then the rest of the data packets. Greedy3 allocates data and parity packets alternatively to optimum channel when possible. Greedy4 allocates data and parity packets alternatively in small bundles, proportional to the ratio of data to parity packets.

Delay-Sensitive Traffic Over Bandwidth-Limited Channels

For transporting real-time streams, it is not only important for a packet to arrive at its destination, but it should also arrive before a set deadline, i.e., the expiration time. Thus, bandwidth is also considered in the model of the channels, as described above. In one embodiment, each j of m channels is modeled by a FIFO queue and transmission link pair, such as shown in FIG. 1: A queue with average service rate $\mu_j$ is connected to a transmission link of fixed delay $\Delta_j$ and Gilbert-modeled bursty loss with packet loss ratio $\mu_j = p_j/(p_j+q_j)$. At a given time, the fullness of the queue j is $I_j$. The time required to transmit a packet through queue j given current queue fullness is $(I_j+1)/\mu_j+\Delta_j$.

In one embodiment, the striping engine 50 distributes packets to m channels at average rate $\Sigma_{i=1}^{m} \mu_i$, the maximum service rate that the set of channels can handle. Correspondingly, the incoming packets do not exceed rate $\Sigma_{i=1}^{m}(1-\pi_i)\mu_i$, the aggregate bandwidth of the m channels. Additionally, the striping engine 50 knows the fullness $I_j$s of the m outgoing queues, such as the fullness of the queues 31a-i shown in FIG. 1. In one embodiment, the striping engine 50 determines the fullness of the outgoing queues as it assigns the incoming packets to different channels.

ARQ-based Algorithm

One embodiment determines the optimal striping algorithm considering only ARQ without FEC. In this embodiment, the look-ahead may be one packet, e.g., optimize one packet at a time with expiration time d. However, multiple packets may be considered at one time when optimizing in other ARQ embodiments.

Let f(d'), d'=d−t, be the probability that a packet with expiration d is correctly and timely delivered to the client 40, where t is the time of optimization instant at the striping engine 50. Correctly delivered indicates that the packet is delivered without loss and errors. Timely delivered indicates that the packet is delivered prior to the completion of the expiration time, d. Let $f_{ARQ}(d')$ be the probability that the same packet is correctly and timely delivered using (re) transmission. For example, the client feedback may indicate that a packet was not received or timely delivered, and the packet is retransmitted. Assuming the client can errorlessly inform the striping engine 50 of the packet loss (packet loss ratio $\pi_j$), the packet has a chance for retransmission with a tighter deadline. That is the expiration time, d, is still running from the original transmission, so the retransmission must be performed within a tighter deadline. In one embodiment, the following is determined:

$$f(d') = \begin{cases} f_{ARQ}(d') & \text{if } d' \ge 0 \\ 0 & \text{o.w.} \end{cases}$$

$$f_{ARQ}(d') = \max_{i=1,\ldots,m} f_{ARQ}^{(i)}(d')$$

-continued $$f_{ARQ}^{(i)}(d') = \begin{cases} (1-\pi_i) + \pi_i f(d' - D_T^i - D_F) & \text{if } d' \geq D_T^{(i)} \\ 0 & o.w. \end{cases}$$

where $$D_T^{(i)} = \frac{l_i + 1}{\mu_i} + \Delta_i$$

is the transmission delay for channel i and $D_F$ is the feedback delay for the receiver to inform the striping engine of the loss event, which is assumed to be the same for all channels.

The equation above can be solved using dynamic programming (DP), where each time $f_{ARQ}(d')$ or $f^{(i)}(d')$ is called, the optimal solution is stored in the [i, d'] entry of a DP table, such as the table 53 shown in FIG. 1. This way each potentially repeated sub problem is solved only once. The computation of the equation for $f^{(i)}_{ARQ}(d')$ is recursive and time consuming, so storing the results in the table saves considerable time when packets having the same expiration time are being optimized. Assume d' and $D_T^i+D_F$ are integers. If they are not integers, one embodiment rounds down d' and rounds up $D_T^i+D_F$ for an approximate solution.

An interpretation of the search space of transmission strategy is that it is a decision tree representing a Markov-decision process. Each transmission decision (selecting channel i) at time t affects at a later time (delay $D_T^i+D_F$) an observation (i.e., transmission status), which spurs another decision until the final signal (transmission success) is observed. One embodiment finds the minimal cost path in such decision tree.

FEC-based Algorithm

Other embodiments determine the optimal striping algorithm considering only FEC and not ARQ. As shown in the previous section, the number of mappings of k data packets and n–k parity packets of RS(n,k) code to m channels can be quite large for reasonable n, k and m. Accordingly, a greedy algorithm, such as the greedy algorithms described in the FEC section above, or an even FEC distribution, where the same number of data and parity packets are evenly allocated to each channel.

Because RS (n, n–1) code is a block code, the receiver must wait until the first n–1 packets are received before channel decoding. Embodiments bound the delay of using FEC, given mapping function g, as the maximum delay experienced by a packet in the n-packet group:

$$D_T = \max_{i=1,\ldots,m} \left[ \frac{l_i + u_i + v_i}{\mu_i} + \Delta_i \right]$$

Let $f_{FEC}(d'_1)$, $d'_1=d_1-t$, be the probability that a packet with expiration $d_1$ is correctly and timely delivered when FEC is used. Because $f_{FEC}(d'_1)$ affects n–1 data packets, it is actually the average success probability of the first n–1 packets in the head of the incoming packet queue. Given RS(n, n–1) code, function g results in PLR $\pi(g)$ $f_{FEC}(d'_1)$ then can be written as:

$$f_{FEC}(d'_1) = \max_n \max_g \left[ \frac{1}{N-1} \sum_{i=1}^{n-1} f_n^g(d'_i) - \lambda \frac{n}{n-1} \right]$$

$$f_n^g(d'_1) = \begin{cases} (1-\pi(g)) & \text{if } d'_i \geq D_T \\ 0 & o.w \end{cases}$$

where $f_{FEC}(d'_1)$ is optimized over a range of n in RS (n, n–1), and a set of EFD FEC mappings {g}.

There is a penalty term $$\lambda\left(\frac{n}{n-1}\right)$$

in the equation above. The reason is that using RS (n, n–1) code invariably increases the traffic volume by factor n/(n–1) because of the addition of the parity packets. Hence a penalty term is used to regulate the packet volume so that it does not lead to queue overflow. Lambda can be selected depending on the total amount of traffic currently in the m outgoing queues.

Hybrid Algorithm with FEC and ARQ

According to an embodiment, striping is performed using a hybrid function combining the ARQ and FEC striping functions above into one hybrid algorithm. The hybrid function, $f(d'_1)$, may be the larger value of the two possible choices of ARQ or FEC:

$$f(d'_1) = \begin{cases} \max[f_{ARQ}(d'_1), f_{FEC}(d'_1)] & \text{if } d'_1 \geq 0 \\ 0 & o.w. \end{cases}$$

where $f_{FEC}(d'_1)$ is now defined recursively to permit retransmission:

$$f_{FEC}(d'_1) = \max_n \max_g \left[ \frac{1}{n-1} \sum_{i=1}^{n-1} f_n^g(d'_i) - \lambda \frac{n}{n-1} \right]$$

$$f_n^g(d'_1) = \begin{cases} (1-\pi(g)) + \pi(g)f(d'_i - D_T - D_F) & \text{if } d'_i \geq D_T \\ 0 & o.w. \end{cases}$$

In this embodiment, probabilities for timely and correctly delivering data to be striped on different channels, i, using different transmission techniques, such as FEC or ARQ, are determined. The channel and transmission technique having the highest probabilities may be selected for striping the data.

Finding Weighting Functions for Hybrid ARQ/FEC

In certain instances, when using the hybrid ARQ/FEC function to stripe data, either ARQ or FEC is selected more often than the other. For example, ARQ may drive the striping system away from any selection of FEC, resulting in a suboptimal local minimum, because ARQ does not require the transmission of additional parity bits. To prevent this pathology, a weighting function for the ARQ recursion of channel i, proportional to the current queue length, $l_i$, is as follows:

$$f_{ARQ}^{(i)}(d')=f_{ARQ}^{(i)}(d')-l_i\rho_i$$

where $\rho_i$ is the weighting parameter and is determined as follows. First a desirable FEC distribution g=(u, v) is determined that is deemed worthy of consideration, such as an FEC distribution that in one on the convex hull of a PLR-(n–k)/k) FEC performance curve, and whose fraction of increased parity (n–k)/k does not overwhelm the outgoing queues given input packet volume. The outgoing queues, such as the queues 31a-i shown in FIG. 1, are increased one packet at a time using an ARQ greedy algorithm until g is inferior in PLR compared to ARQs. Given this set of modified queue lengths, l', for each of i channels, the channel with the worst PLR ($n_{max}$) is determined. The weighting parameter $\rho_i$ is then:

$$\rho_i = \frac{\Pi_{max} - \Pi_i}{l'_i}$$

Doing so will ensure that when queue length, l, reaches l', for channel i, the hybrid ARQ/FEC function will select the worst channel before channel i for ARQ before completely eliminating FEC distribution g from consideration.

It will be apparent to one of ordinary skill in the art that other transmission techniques, incorporation error detection and/or correction, may be used instead of FEC, ARQ or hybrid FEC/ARQ. The weighting factor and weighting parameter may be used for these other transmission techniques when one transmission technique is chosen substantially more frequently than another transmission technique due, for example, to queue length, l.

Variable Delay and Quantizing

As described above, the Gilbert loss model may be used to model the channels 30a-c shown in FIG. 1 as bandwidth-limited, burst-loss channels. According to an embodiment, the model is expanded to model the channels as bandwidth-limited, burst-loss channels with random, variable delays.

For example, assuming m channels are available for transmission, each j of the m channels is modeled by a FIFO queue and transmission link pair comprising a queue with a constant service rate $\mu_j$ connected to a transmission link of shifted-Gamma-distributed random variable delay $\gamma_j \sim G(\kappa_j, \alpha_j, \lambda_j)$ and Gilbert-modeled burst loss of parameters $p_j$ and $q_j$. At a given time, the fullness of the queue j is $l_j$. The time required to transmit a packet through queue j is then: $(l_j+1)/\mu_j+\gamma_j$. In more detail, a Gamma random variable $\gamma$ with Gamma shape parameter $\alpha$ and scale parameter $\lambda$ has the following probability density function (pdf):

$$g\Gamma(\gamma) = \frac{\lambda(\lambda\gamma)^{\alpha-1}e^{-\lambda\gamma}}{\Gamma(\alpha)} \quad 0 < \gamma < \infty$$

where $\Gamma(\alpha)$ is the Gamma function:

$\Gamma(\alpha) = \int_0^\infty \tau^{\alpha-1} e^{-\tau} d\tau \; \alpha > 0$

Similarly, the shifted version of the Gamma random variable with shift parameter $\kappa$ is:

$$g\Gamma_s(\gamma) = \frac{\lambda^\alpha(\gamma-\kappa)^{\alpha-1}e^{-\lambda(\gamma-\kappa)}}{\Gamma(\alpha)} \quad \kappa < \gamma < \infty$$

In addition, the client 40 can inform the striping engine 50 shown in FIG. 1 of a loss event losslessly in constant time $D_F$.

For input into the striping engine 50 it is assumed the packets in the incoming queue $l_1$ before the striping engine 50 are labeled with expiration times $d_i$'s. A packet with $d_i$ must be delivered by time $d_i$ or it expires and becomes useless. The packets may be ordered in the incoming queue $I_1$ by earliest expiration times, and the striping engine 50 is activated whenever there is a packet in the incoming queue $l_i$.

For the ARQ-based algorithm, one packet may be optimize at a time with expiration time d. Let f(d'),d'=d–t, be the probability that a packet with expiration d is timely delivered to the client 40, where t is the time of optimization instant at the striping engine 50. Let $f_{ARQ}$(d') be the probability that the same packet is timely delivered using (re)transmission (ARQ). Let $f_{ARQ}^{(i)}$(d') be the probability that the same packet is timely delivered if channel i is first used for ARQ. Given the client 40 can errorlessly inform the striping engine 50 of the loss event in time $D_F$, the packet has a chance for retransmission with a tighter deadline. f(d') and $f_{ARQ}$(d') can be represented as follows:

$$f(d') = \begin{cases} f_{ARQ}(d') & \text{if } d' \geq 0 \\ 0 & o.w. \end{cases}$$

$$f_{ARQ}(d') = \max_{i=1,\ldots,m} f_{ARQ}^{(i)}(d')$$

Also, $f_{ARQ}^{(i)}$(d') can be represented as follows:

$$f_{ARQ}^{(i)}(d') = \int_{\kappa_i}^{d'} -\left(\frac{l_i+1}{\mu_i}\right) g\Gamma_s(\gamma)\left((1-\pi_i) + \pi_i f\left(d' - D_f\left(\frac{l_i+1}{\mu_i}\right) - \gamma\right)\right) d\gamma$$

The interval over which the integral is taken is written as such, because $g\Gamma_s(\gamma)$ is zero for transmission $\gamma < \kappa_i$, and the packet in question will miss its deadline d for $$\gamma > d' - \left(\frac{l_i+1}{\mu_i}\right).$$

With regard to quantization and dynamic programming, the integral in the equation for $f_{ARQ}^{(i)}$(d') includes a recursive call in the integral. Accordingly, it is difficult to solve directly. According to an embodiment, $f_{ARQ}^{(i)}$(d') is first approximated using quantization, before using dynamic programming to resolve the recursive calls. By quantization, the non-zero area under the pdf $$g\Gamma_s(\gamma), \gamma \leq d' - \left(\frac{l_i+1}{\mu_i}\right)$$

is divided into L evenly spaced regions, where region l has boundaries $$[b_{l-1}^{(i)}, b_l^{(i)}]:$$

$$b_{l-1}^{(i)} = \kappa_i + \frac{l-1}{L}\left(d' - \left(\frac{l_i+1}{\mu_i}\right) - \kappa_i\right)$$

$$b_l^{(i)} = \kappa_i + \frac{l}{L}\left(d' - \left(\frac{l_i+1}{\mu_i}\right) - \kappa_i\right)$$

Values falling within each region may be quantized to one of the boundaries. If all the delays in each region l are quantized to $b_l^{(i)}$, each region has probability $$\int_{b_{l-1}^{(i)}}^{b_l^{(i)}} g_\Gamma^{(i)}(\gamma)d\gamma,$$

and the equation for $f_{ARQ}^{(i)}(d')$ can bed approximated to:

$$f_{ARQ}^{(i)}(d') \approx \sum_{l=1}^{L} \int_{b_{l-1}^{(i)}}^{b_l^{(i)}} g_{\Gamma_s}^{(i)}(\gamma)d\gamma\left[(1-\pi_i) + \pi_i f\left(d' - D_f - \left(\frac{l_i+1}{\mu_i}\right) - b_l^{(i)}\right)\right]$$

This equation for $f_{ARQ}^{(i)}(d')$ is much easier to solve, because the integral no longer includes the recursive call and can be solved with dynamic programming. For example, each time f(d') is called, the solution is stored in the d'th entry of the table, so that if a repeated recursive call f(d') is made, the answer can simply be looked up.

Computer System and Computer Readable Medium

Figure 4:
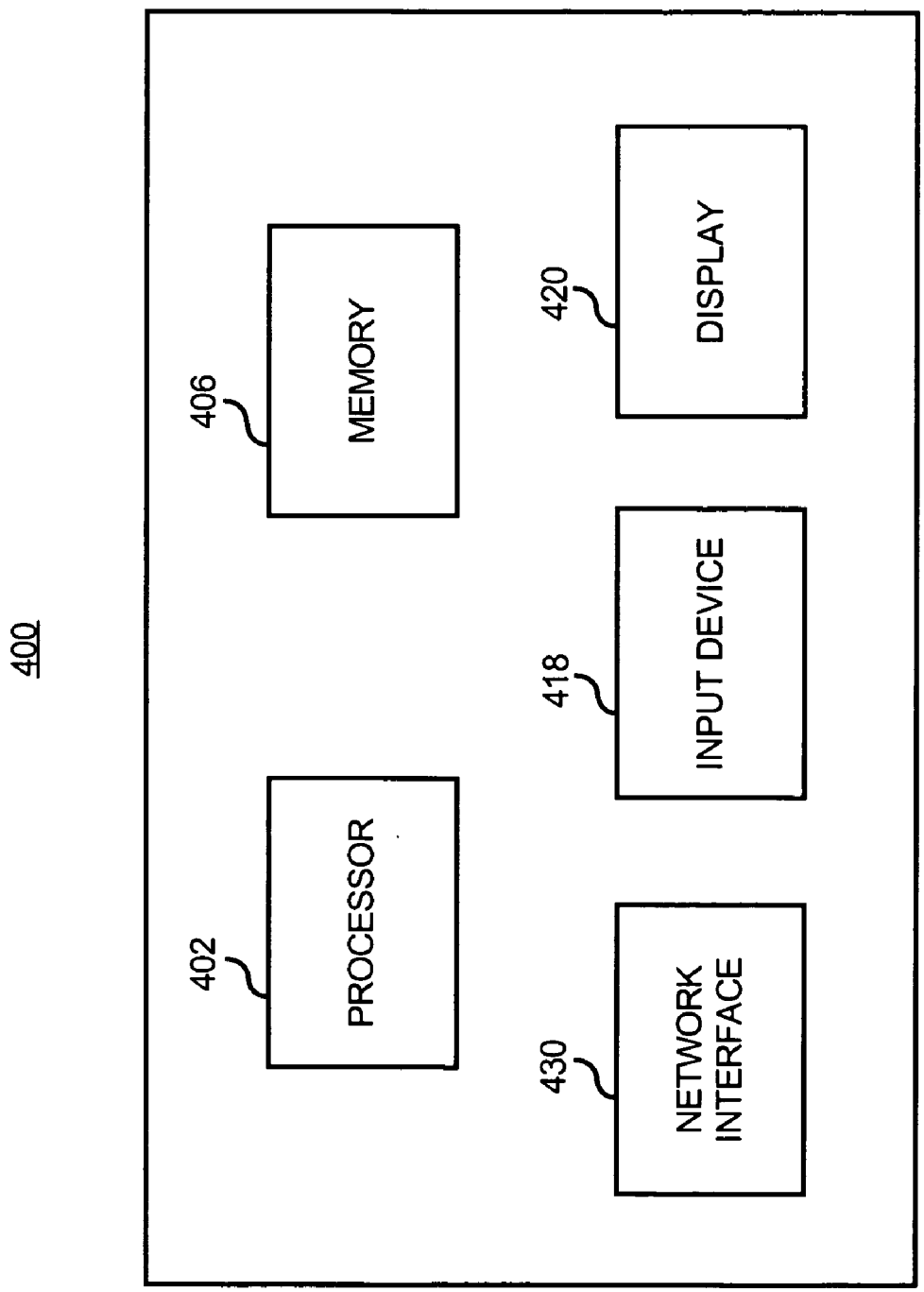
FIG. 4 illustrates an embodiment of a computer system that may be used in the systems shown in FIGS. 1 and 2.

Referring to FIG. 4, a schematic diagram of a computer system 700 is shown in accordance with an embodiment. The computer system 400 may be used in the systems shown in FIGS. 1 and 2. The computer system 400 may include one or more processors, such as processor 402, providing an execution platform for executing software. The computer system 400 also includes a memory 406, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 400 with one or more input devices 418, such as a keyboard, a mouse, a stylus, and the like and a display 420. A network interface 430 is provided for communicating with other computer systems. It will be apparent to one of ordinary skill in the art that FIG. 4 is meant to illustrate a generic computer system. Any type of computer system may be used. Furthermore, one or more components of the components of the computer system 400 are optional, such as the display and input devices, and other types of components may be used or substituted as is known in the art.

One or more of the steps of the methods 300 and other steps described herein may be implemented as software embedded or stored on a computer readable medium, such as the memory 406, and executed by the processor 402. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

Those skilled in the art will recognize that variations of the embodiments are possible within the scope as defined in the following claims and their equivalents.

What is claimed is:

1. A method of striping data by a striping engine in a transmitter over a plurality of transmission channels having limited bandwidths and variable delays, the method comprising:
    accessing a plurality of packets of data to be striped over the plurality of channels, wherein the plurality of packets is stored in a queue and at least one packet of the plurality of packets includes an expiration time;
    accessing the expiration time of the at least one packet of the plurality of packets to be striped;
    computing, by a processor, probabilities of timely receiving the at least one packet at a destination using a recursive function and the expiration time for the at least one packet and a length of the queue storing the at least one packet waiting to be striped;
    storing the computed probabilities in a table;
    retrieving the computed probabilities from the table for at least one other packet of the plurality of packets having the same expiration time as the at least one packet and the same queue length as the at least one packet; and
    mapping the at least one other packet to at least one of said plurality of channels based on the retrieved probabilities.

2. The method of claim 1, wherein computing probabilities comprises:
    computing probabilities of timely receiving the at least one packet on each of the plurality of channels, wherein the recursive function models each of the plurality of channels as having a random variable delay.

3. The method of claim 2, wherein the recursive function is defined recursively with an integral and computing probabilities comprises:
    using quantization to resolve calls to the recursive function.

4. The method of claim 1, wherein computing probabilities comprises:
    computing probabilities of timely receiving the at least one packet for a plurality of different transmission techniques.

5. The method of claim 4, wherein mapping the at least one other packet comprises:
    selecting a transmission technique of the plurality transmission techniques having a greatest probability of transmitting the at least one other packet to a destination without loss and before the expiration time of the at least one other packet, wherein the greatest probability is one of the retrieved probabilities.

6. The method of claim 5, further comprising:
determining a weighting factor for at least one of the plurality of transmission techniques; and
weighting the at least one of the plurality of transmission techniques using the weighting factor such that the same transmission technique is not selected each time one of the plurality of transmission techniques is being selected.

7. The method of claim 6, wherein determining a weighting factor comprises:
determining the weighting factor based on loss rate and queue length for a channel of the plurality of channels.

8. The method of claim 7, wherein determining a weighting factor comprises:
subtracting probability loss rate for the channel from a maximum probability loss rate for the channel to determine a loss rate value; and
dividing the loss rate value by the queue length for the channel to determine the weighting factor.

9. The method of claim 6, further comprising:
selecting a channel of the plurality of channels having a greatest probability of transmitting the at least one other packet to a destination without loss and before the expiration time of the at least one other packet, wherein the greatest probability is one of the retrieved probabilities.

10. The method of claim 1, further comprising:
storing a maximum number of entries in the table, wherein each entry is calculated using the recursive function and an expiration time of a packet to be striped on a channel of the plurality of channels; and
using an indexing function to place or retrieve a value in the table and to limit a number of entries in the table to the maximum number of entries.

11. The method of claim 1, wherein computing probabilities using a recursive function comprises computing the probabilities using a recursive function modeling the plurality of channels based on delay of each channel, limited bandwidth of each channel and loss rate of each channel.

12. The method of claim 1, further comprising:
transmitting the at least one other packet on the channel mapped to the at least one other packet.

13. The method of claim 1, further comprising:
determining an expiration time for each of the plurality of packets, wherein a packet of the plurality of packets is unusable if it is received at a final destination after the expiration time.

14. The method of claim 1, wherein each of the plurality of channels is a burst loss, limited bandwidth, variable delay, wireless channel.

15. An apparatus operable to stripe time sensitive data over a plurality of transmission channels, wherein the time sensitive data includes a plurality of packets stored in a queue and at least one packet of the plurality of packets includes an expiration time, the apparatus comprising:
a striping engine including
an optimizer operable to
access the expiration time of the at least one packet waiting to be striped,
compute probabilities of timely receiving the at least one packet at a destination using the expiration time of the at least one packet and a length of the queue,
store the computed probabilities in a table,
retrieve the computed probabilities from the table for at least one other packet of the plurality of packets having the same expiration time as the at least one packet, and
select a channel of the plurality of channels and a transmission error correction technique of a plurality of transmission error correction techniques based on the retrieved probabilities; and
a mapper operable to assign the at least one other packet to be striped to the selected channel for transmission to the destination using the selected transmission error correction technique; and
a network interface operable to transmit the at least one other packet to be striped on the selected channel using the selected transmission error correction technique.

16. The apparatus of claim 15, wherein the plurality of channels comprise burst loss, limited bandwidth, variable delay, wireless channels.

17. The apparatus of claim 15, wherein the selected transmission error correction technique comprises one of forward error correction and automatic repeat-request.

18. The apparatus of claim 15, wherein computing the probabilities of timely receiving the at least one packet at the destination further comprises using a recursive function.

19. The apparatus of claim 18, wherein the recursive function models each of the plurality of channels as having a random variable delay and the recursive function is defined with a recursive integral and quantization is used to resolve calls to the recursive function.

20. A non-transitory computer readable medium storing executable instructions which, when executed by a processor, causes the processor to perform a method of striping data over a plurality of transmission channels having limited bandwidths and variable delays, the method comprising:
accessing a plurality of packets of data to be striped over the plurality of channels, wherein the plurality of packets is stored in a queue and at least one packet of the plurality of packets includes an expiration time;
accessing the expiration time of the at least one of said plurality of packets;
computing probabilities of timely receiving the at least one packet at a destination using a recursive function, the expiration time for the at least one packet and a length of the queue storing the at least one packet waiting to be striped;
storing the computed probabilities in a table; retrieving the computed probabilities from the table for at least one other packet of the plurality of packets having the same expiration time and queue length as the at least one packet; and
mapping the at least one other packet to at least one of said plurality of channels based on the retrieved probabilities.

* * * * *